March 23, 1926. 1,577,783
W. F. BAKER
HOISTING ATTACHMENT FOR TRACTORS
Filed April 25, 1923 3 Sheets-Sheet 1
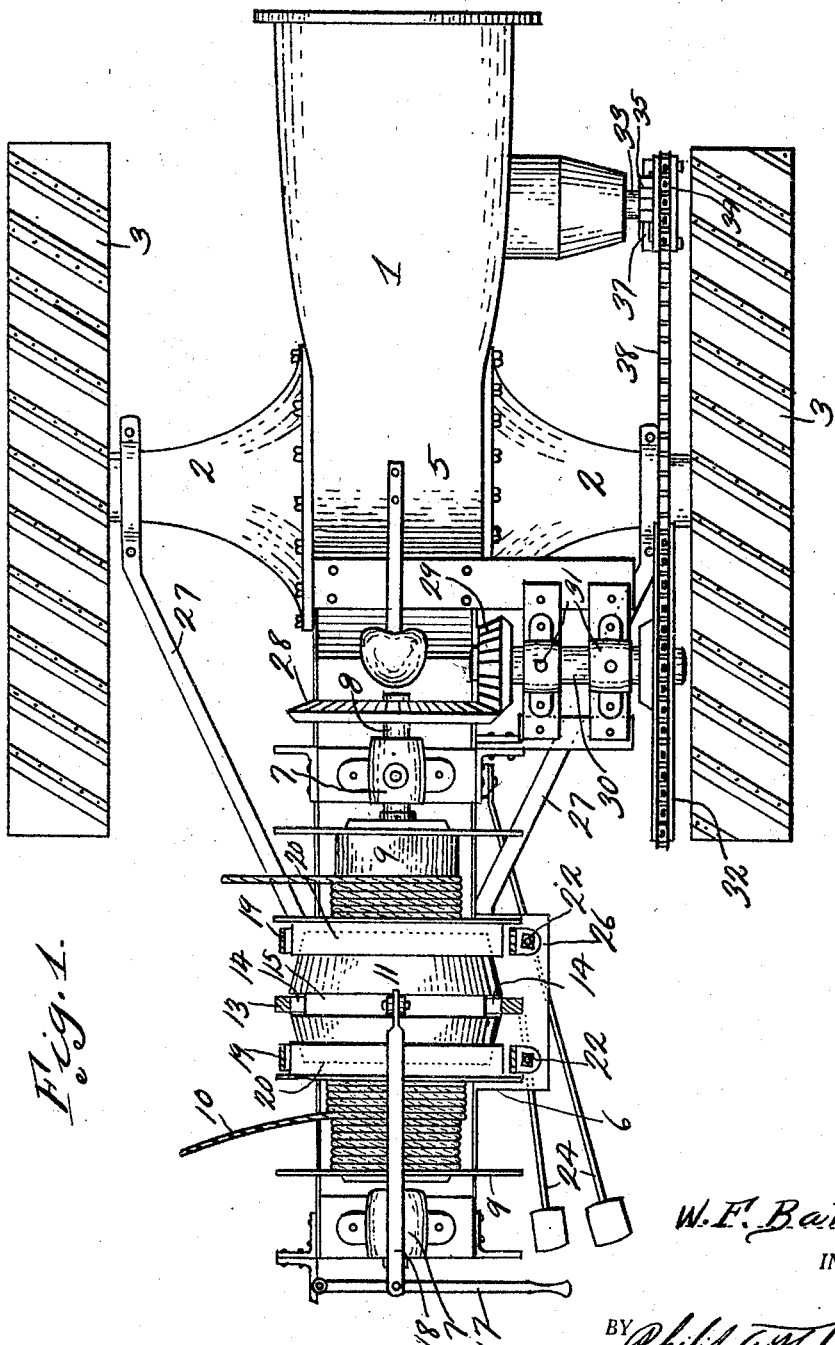
W. F. Baker
INVENTOR.
BY
ATTORNEY.

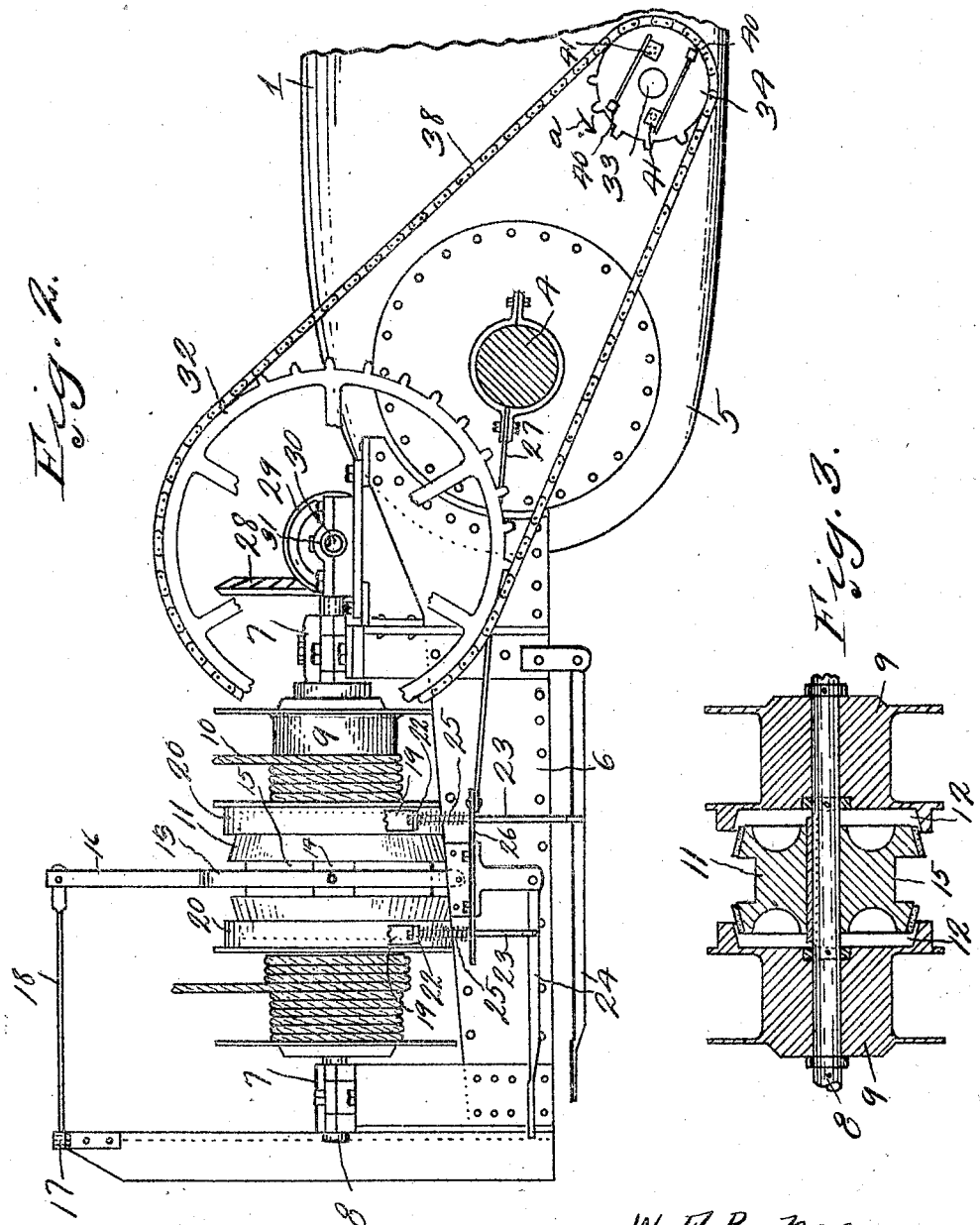

March 23, 1926.
W. F. BAKER
1,577,783
HOISTING ATTACHMENT FOR TRACTORS
Filed April 25, 1923   3 Sheets-Sheet 3
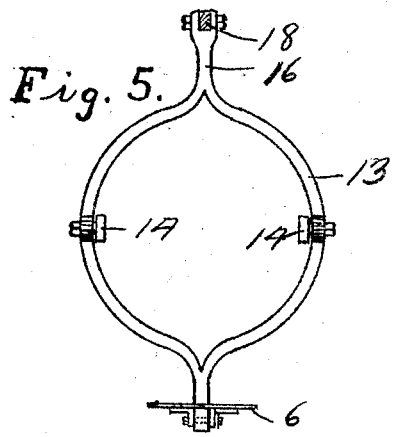
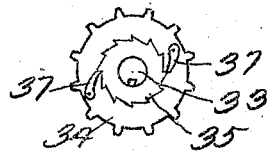
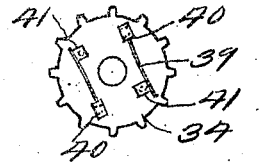
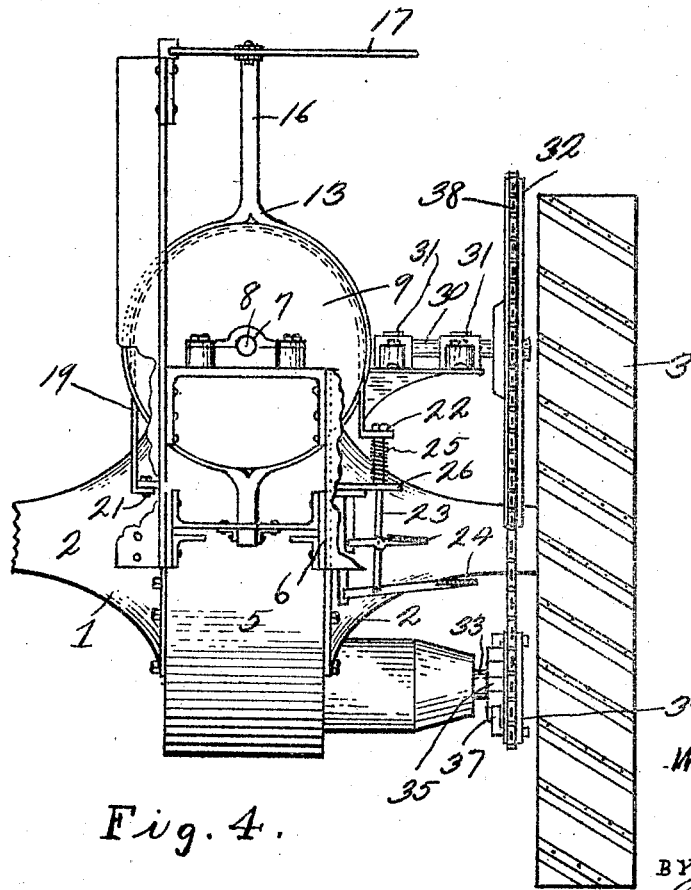
W. F. Baker
INVENTOR.
BY
ATTORNEY.

Patented Mar. 23, 1926.

1,577,783

UNITED STATES PATENT OFFICE.

WILBER FISK BAKER, OF OMAHA, NEBRASKA, ASSIGNOR TO BAKER STEEL & MACHINERY COMPANY, A CORPORATION OF NEBRASKA.

HOISTING ATTACHMENT FOR TRACTORS.

Application filed April 25, 1923. Serial No. 634,487.

*To all whom it may concern:*

Be it known that WILBER FISK BAKER, a citizen of the United States, residing at Omaha, in the county of Douglas and State of Nebraska, has invented certain new and useful Improvements in Hoisting Attachments for Tractors, of which the following is a specification.

The invention relates to hoisting attachments for tractors, and has for its object to provide in combination with a tractor, a hoisting device, which may be used as an elevating device for hoisting material, or as a pulling device for pulling a scraper, for instance during the unloading of sand from cars, or filling ditches.

A further object is to provide a hoisting attachment carried by a frame secured to the rear end of a tractor, preferably to the rear axle drive casing, and in which frame spaced hoisting drums are rotatably mounted on a shaft and locked to said shaft as desired by a clutch element keyed on the shaft and movable between clutch elements carried by the drums for locking either drum to the shaft. Also to provide foot controlled brake levers for controlling or holding either drum.

A further object is to provide a gear and chain connection between the drum shaft and a rotatable shaft driven by the engine of the tractor, whereby said drum shaft may be rotated.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawings:—

Figure 1 is a top plan view of the rear end of a conventional form of tractor, showing the hoisting device applied thereto.

Figure 2 is a side elevation of the hoisting device and a portion of the tractor.

Figure 3 is a longitudinal sectional view through the drums and the slidable clutch element.

Figure 4 is a rear elevation of the rear end of the tractor and the hoisting device.

Figure 5 is a view in elevation of the movable clutch element yoke.

Figure 6 is a side elevation of the drive sprocket showing the ratchet and pawl connection to a drive shaft of the tractor.

Figure 7 is a view of the drive sprocket showing the opposite side thereof.

Referring to the drawing, the numeral 1 designates a portion of a conventional form of tractor and 2 the rear axle housings. The wheels 3 of the tractor are driven by means of the rear axle 4 in the usual manner. It has been found that tractors are not provided with hoisting mechanisms whereby the tractor may be used for hoisting purposes, therefore the range of use of the tractor is substantially limited to draft purposes. To overcome this difficulty the rear end of the casing 5 is provided with rearwardly extending horizontally disposed frame 6, which frame has rotatably mounted in bearings 7 thereof a horizontally disposed drum shaft 8, on which is rotatably mounted cable drums 9, around which drums cables 10 extend. Slidably keyed on the shaft 8 between the drums 9 is a double male clutch 11, which clutch may be moved into binding engagement with the clutch elements 12 carried by the drums 9, whereby either drum may be locked to the shaft 8 for rotation therewith or for imparting a pull on the cables 10 during a hoisting or scooping operation. Pivotally mounted in the frame 6, at a point beneath the clutch element 11 is a clutch controlling yoke 13, which yoke is provided with pivoted blocks 14, which blocks engage in the groove 15 of the clutch element 11. It will be seen that when the yoke arm 16 is moved by the control lever 17, through the medium of the connecting rod 18, the clutch member 11 may be moved into cooperative engagement with either drum 9 for locking and rotating the engaged drum with the drum shaft 8. However to further control the drums 9, strap brakes 19 are provided, which brakes extend around flanges 20 of the drums 9 and have their ends secured at 21 to the frame 6, and their other ends connected at 22 to vertically disposed rods 23, which rods are pivotally connected to foot levers 24, therefore it will be seen that either brake band 19 may be contracted for engaging the flanges 20 of the drum and controlling the rotation thereof, particularly during a lowering operation. Brake bands 19 are normally held out of engagement with the drums by means of expansible coiled springs 25, which engage the ends of the bands 19 and a flange 26, carried by the frame. The frame is braced from the axle housings 2 by means of braces 27.

The forward end of the drum shaft 8 is provided with a bevelled gear 28, which bevelled gear meshes with a bevelled gear 29 carried by a transversely disposed shaft 30. Transversely disposed shaft 30 is rotatably mounted in bearings 31 carried by the frame 6 and has its outer end provided with a sprocket 32 adjacent the axle housing 2 and relatively large. The tractor 1 is provided with a transversely disposed driven shaft 33, which rotates in the direction of the arrow $a$, and on which shaft a sprocket 34 is rotatably mounted. However the shaft 33 is provided with a ratchet wheel 35, with which ratchet wheel pawls 37 carried by the sprocket 34 cooperate in a manner whereby when the shaft 33 is rotated in the direction of the arrow $a$ for winding the cables 10 on the drums 9, the sprocket wheel and shaft will be locked together through the medium of the ratchet wheel 35 and dogs 37, thereby imparting rotation to the sprocket 32 through the medium of the sprocket chain 38. The dogs 37 are pivotally mounted on the sprocket 34 and are spring actuated through means of leaf springs 39 anchored at 40 to the sprocket 34 on an opposite side thereof to the pawls and cooperate with rectangular shaped members 41 carried by the pivotal shaft of the pawls in such a manner that the pawls are spring actuated, said springs engaging flat surfaces of said rectangular shaped members. On an unwinding operation the drums are controlled through the medium of the clutch member 11 and the controlling brakes 19.

From the above it will be seen that a hoisting attachment is provided for tractors, which hoisting attachment may be easily and quickly applied to a conventional form of tractor and utilized for hoisting materials, or for pulling a scraper or for any other cable and drum work. The device is located to the rear end of the tractor where it can be easily controlled and operated by the operator and all of the controlling levers, both foot and hand are located adjacent each other, in position, whereby a single operator may maintain at all times complete control over the device.

The invention having been set forth what is claimed as new and useful is:—

1. The combination with the rear axle housing of a tractor, of a hoisting device carried by said housing and extending rearwardly therefrom, said hoisting device comprising a frame, a longitudinally disposed shaft rotatably mounted in bearings of the frame and disposed rearwardly of the housing, hoisting drums carried by said shaft, lever means for controlling said drums, clutch means for locking said drums to the shaft, a transversely disposed shaft carried by the frame, gear connections between both of the shafts, a tractor driven shaft, sprockets carried by said tractor driven shaft and transversely disposed shaft, a sprocket chain extending around said sprockets and a ratchet connection between the tractor driven shaft and the sprocket carried thereby.

2. The combination with a rear axle housing of a tractor, of a hoisting device supported by said housing, said device comprising a rearwardly extending frame, a longitudinally disposed drum shaft rearwardly of the housing, drums rotatably mounted on said shaft, a slidably keyed clutch element carried by said shaft and cooperating with said drums between the same, independent brake controlling means for said drums and means for driving said drum shaft from the tractor, through the medium of gear connections and sprocket and chain connections.

In testimony whereof I affix my signature.

WILBER FISK BAKER.